US012779850B2

(12) United States Patent
Shimazu et al.

(10) Patent No.: US 12,779,850 B2
(45) Date of Patent: Nov. 3, 2026

(54) ACTUATOR, LIQUID DISCHARGE HEAD, AND PRODUCTION METHOD OF ACTUATOR

(71) Applicant: CANON KABUSHIKI KAISHA, Tokyo (JP)

(72) Inventors: Akira Shimazu, Kanagawa (JP); Takashi Ikeda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 182 days.

(21) Appl. No.: 18/932,252

(22) Filed: Oct. 30, 2024

(65) Prior Publication Data

US 2025/0144935 A1 May 8, 2025

(30) Foreign Application Priority Data

Nov. 6, 2023 (JP) ................................ 2023-189033

(51) Int. Cl.
*B41J 2/14* (2006.01)
*B41J 2/16* (2006.01)

(52) U.S. Cl.
CPC ........... *B41J 2/14233* (2013.01); *B41J 2/161* (2013.01); *B41J 2/1628* (2013.01); *B41J 2/1631* (2013.01); *B41J 2/164* (2013.01); *B41J 2/1642* (2013.01); *B41J 2/1643* (2013.01); *B41J 2/1646* (2013.01); *B41J 2002/14258* (2013.01); *B41J 2002/14491* (2013.01)

(58) Field of Classification Search
CPC ........ B41J 2/14233; B41J 2/161; B41J 2/164; B41J 2002/14258; B41J 2002/14491; B41J 2/1628; B41J 2/1631; B41J 2/1642; B41J 2/1643; B41J 2/1646
See application file for complete search history.

(56) References Cited

U.S. PATENT DOCUMENTS

2018/0090664 A1* 3/2018 Kakiuchi ............. B41J 2/14072
2018/0264809 A1* 9/2018 Mizukami .............. B41J 2/1645
2019/0291431 A1* 9/2019 Sugawara ............ B41J 2/14233

FOREIGN PATENT DOCUMENTS

JP 2005032919 A 2/2005

* cited by examiner

*Primary Examiner* — Henok D Legesse
(74) *Attorney, Agent, or Firm* — Canon.U.S.A., IP Division

(57) ABSTRACT

An actuator includes a piezoelectric element including a first electrode, a piezoelectric layer, and a second electrode on a substrate in this order, a wiring line electrically connected to at least one of the first electrode and the second electrode, and an insulation layer arranged to contact and cover the wiring line, wherein a thickness of the wiring line is less than a thickness of the insulation layer in a direction perpendicular to the substrate, and the thickness of the insulation layer is 500 nm or less.

20 Claims, 12 Drawing Sheets

ACTUATOR, LIQUID DISCHARGE HEAD, AND PRODUCTION METHOD OF ACTUATOR

BACKGROUND

Field

The present disclosure relates to an actuator, a liquid discharge head, and a production method of the actuator.

Description of the Related Art

A piezoelectric film, which changes its shape by an electric field being applied thereto, is applied to various industrial products as a means for moving or vibrating an object minutely and accurately. For example, the piezoelectric film is used for a small-size speaker, a hard disk drive, a printer (liquid discharge apparatus), or the like. In these apparatuses, there are some printers that employ a piezoelectric film as a driving element of a liquid discharge head that discharges liquid. In such a liquid discharge head, the piezoelectric film is driven to discharge liquid, by applying an electric field via electrodes (upper electrode and lower electrode) formed to sandwich the piezoelectric film from above and below. At this time, a voltage required for sufficiently displacing the piezoelectric film is several tens of volts, which is relatively high for a semiconductor device. On the other hand, the discharge port density of the liquid discharge head becomes higher to print a high-resolution image, and wiring lines and electrodes having different potentials are arranged densely on a substrate including a driving element.

The liquid discharge head including the actuator having such a piezoelectric film may be prone to failure caused by a short-circuit between wiring lines or between a wiring line and a lower electrode due to a creepage effect on the device surface, or a wiring line corrosion. For this reason, sufficiently covering the wiring lines with an insulation layer (passivation film) is important, but covering the step portions of side surfaces of the wiring lines resulting from the thicknesses of the wiring lines without the insulation layer being cracked is not easy. One solution for this issue is that the film thickness of the insulation layer may be simply increased. However, increasing the thickness of the layer sometimes causes a distortion of the substrate (wafer) due to a film stress, or an unnecessarily longer processing time when etching the insulation layer thereafter, which is not desirable.

For the above issue, Japanese Patent Application Laid-open No. 2005-032919 discusses a configuration for improving the coverage property of the insulation layer on the wiring lines in a semiconductor device including a semiconductor film and wiring lines on a substrate. The coverage property of the insulation layer contacting and covering the wiring lines is improved by providing cross-sectional shape tapers to the wiring lines. In Japanese Patent Application Laid-open No. 2005-032919, the taper shape is obtained by providing a multilayer structure to the wiring line, and changing the processing conditions of etching. Thus, a film deposition apparatus and a plurality of materials for forming a plurality of layers are required, and also the management of a forming process for each layer becomes necessary. Further, there may be a case where the degree of freedom of materials that can be used to compose the wiring lines reduces. It is because a material that can form a desired taper shape while satisfying conditions such as adhesiveness with an underlaying film on which the wiring lines are formed, easiness of etching, electric resistivity, atomic diffusion rate to a film in contact with the wiring lines, and the like, needs to be selected.

Another method for forming cross-sectional taper shapes of the wiring lines is a method of providing taper shapes to the ends of the resist film used when the wiring lines are etched, and transferring the shapes to the etched portions. However, to achieve the desired shapes of the taper portions of the resist film, the materials for the resist film is limited and the management of a process becomes complicated when patterning the resist film, which may become factors of reducing the yield. Examples of the process management factors when patterning the resist film include an exposure amount of light irradiation, a temperature, an exposure time, a flow control of exhaust air and air in an exposure apparatus.

As described above, with the method of providing tapers to the cross-section shapes of the wiring lines to increase the covering property of the insulation layer that contacts and covers the wiring lines, there is an issue in selectivity of the material, and that the process control tends to become complicated.

SUMMARY

The present disclosure is directed to a piezoelectric actuator with a wiring line therein sufficiently covered by an insulation layer, and having a high electric reliability.

According to some embodiments, an actuator includes a piezoelectric element including a first electrode, a piezoelectric layer, and a second electrode on a substrate in this order, a wiring line electrically connected to at least one of the first electrode and the second electrode, and an insulation layer arranged to contact and cover the wiring line, wherein a thickness of the wiring line is less than a thickness of the insulation layer in a direction perpendicular to the substrate, and the thickness of the insulation layer is 500 nm or less.

Further features of the present disclosure will become apparent from the following description of exemplary embodiments with reference to the attached drawings.

DESCRIPTION OF THE EMBODIMENTS

Various exemplary embodiments, features, and aspects of the present disclosure will be described with reference to the attached drawings. The components having the same functions are assigned the same symbols, and redundant descriptions thereof may sometimes be omitted. Hereinbelow, examples of applying the present disclosure to a piezoelectric actuator used in a liquid discharge head provided in a liquid discharge apparatus serving as an inkjet printer will be described. However, the present disclosure is not limited to the exemplary embodiments described below, and can be changed within the range which those skilled in the art can conceive and achieve, such as other exemplary embodiments, additions, modifications, and removals. Any of the embodiments should be included in the range of the present disclosure, as long as the embodiment achieves an action and an effect of the present disclosure.

Configuration of Liquid Discharge Apparatus

Figure 1:
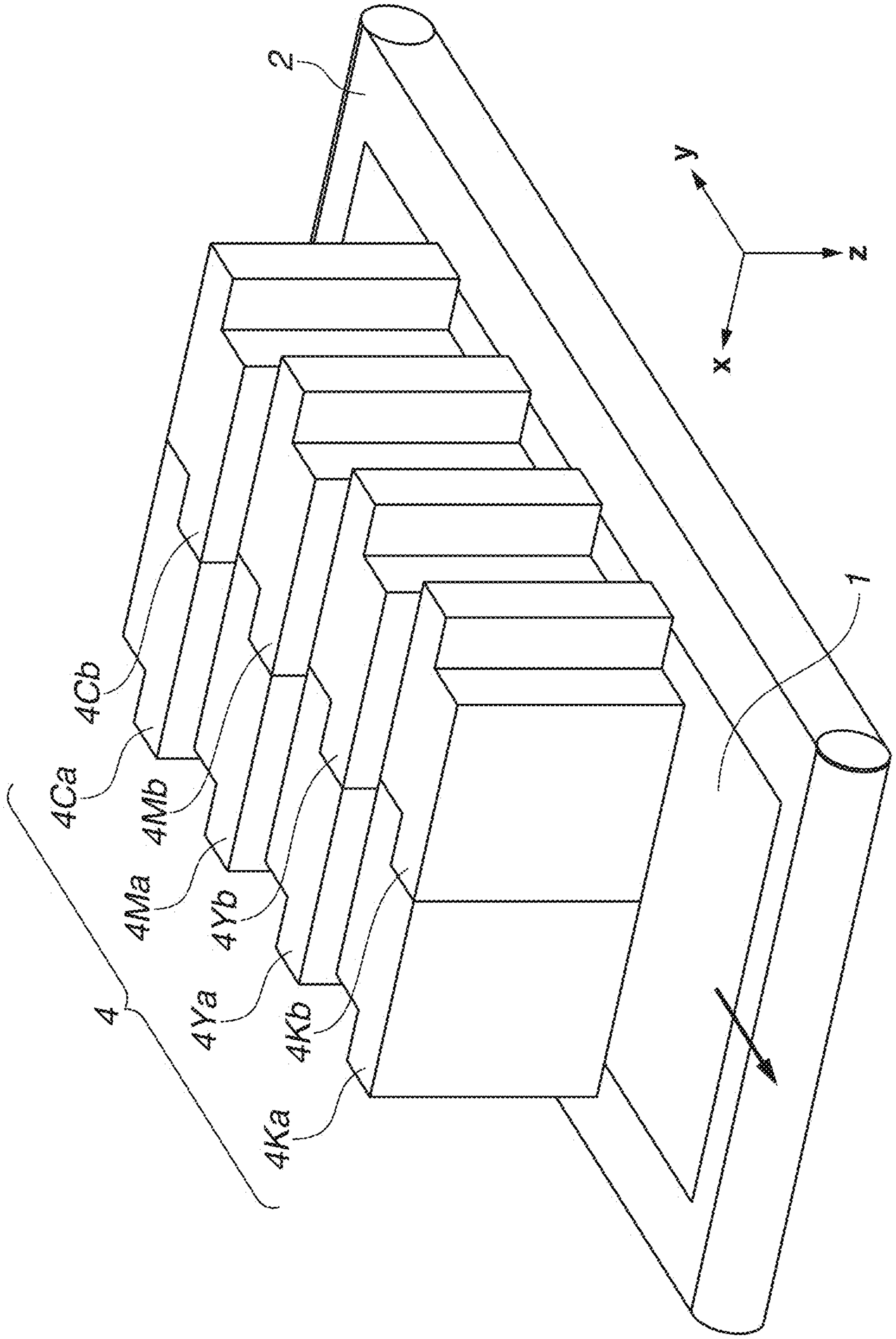
FIG. 1 is a diagram illustrating an example of a liquid discharge apparatus according to the present disclosure.

FIG. 1 is a diagram illustrating a configuration example of a liquid discharge apparatus according to a first exemplary embodiment. The liquid discharge apparatus illustrated in FIG. 1 is a one-pass type liquid discharge apparatus that records an image with one movement of a recording medium 1. More specifically, FIG. 1 illustrates an example of the liquid discharge apparatus (hereinbelow, sometimes referred to an apparatus body) including a liquid discharge head 4 serving as a full line head in which element substrates with discharge ports for discharging liquid are arranged across a side corresponding to a full width of the recording medium 1. The recording medium 1 is conveyed in an arrow direction by a conveyance unit 2 and recorded by the liquid discharge head 4. The liquid discharge heads 4 according to the present disclosure can be achieved by a configuration in FIG. 1 and any configuration including the configuration example in FIG. 1, and also not limited to other configurations. FIG. 1 illustrates the liquid discharge apparatus including the liquid discharge heads 4 consisting of eight liquid discharge heads of 4Ka, 4Kb, 4Ya, 4Yb, 4Ma, 4Mb, 4Ca, and 4Cb. These eight liquid discharge heads 4Ka, 4Kb, 4Ya, 4Yb, 4Ma, 4Mb, 4Ca, and 4Cb are positioned each by a reference member within the liquid discharge apparatus.

In addition, as described above, each of the liquid discharge heads 4 according to the present exemplary embodiment is the one-pass type head having a length corresponding to a width (size in a direction orthogonal to a conveyance direction of the recording medium 1) of the recording medium 1, which is so-called a page-wide type head. However, the present disclosure can be applied to a liquid discharge head, so-called serial type liquid discharge head, that performs recording while scanning the liquid discharge head across a recording medium. Examples of the serial type liquid discharge head include a liquid discharge head having a configuration with an element substrate for black ink and an element substrate for color ink mounted thereon. Examples other than that include a liquid discharge head having a configuration with a width shorter than the recording medium 1, in which several element substrates are arranged so that discharge ports overlap each other in a discharge port array direction.

Configuration of Liquid Discharge Head

Figure 2:
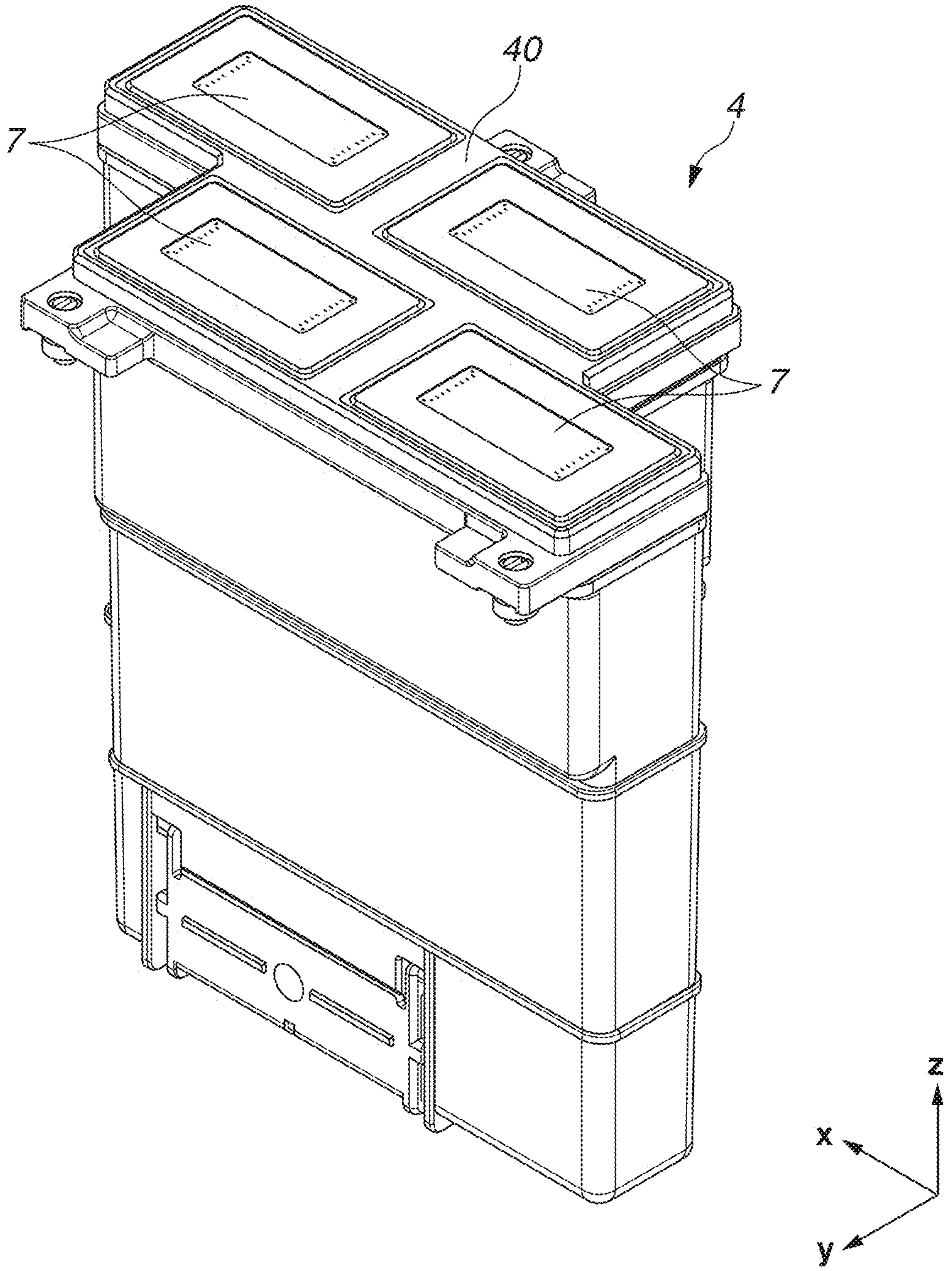
FIG. 2 is a diagram illustrating an example of a liquid discharge head according to the present disclosure.
Figure 3:
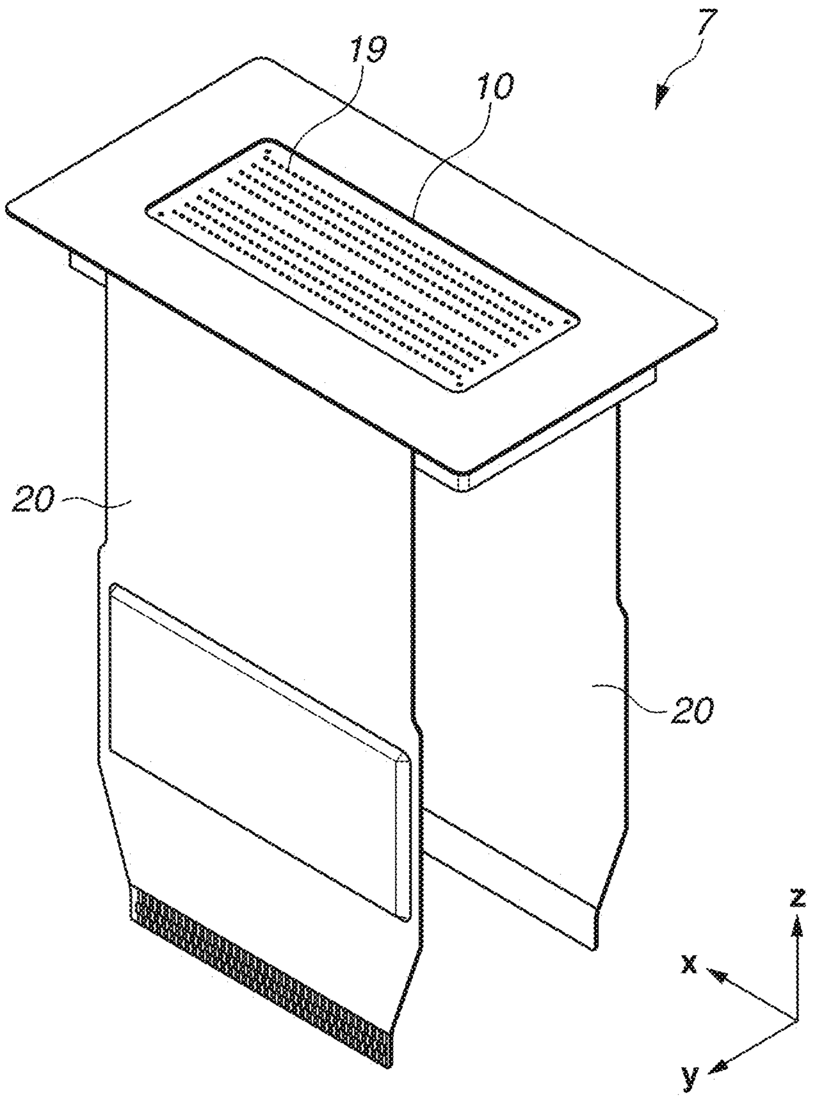
FIG. 3 is a diagram illustrating an example of a liquid discharge unit according to the present disclosure.

FIG. 2 is a perspective view illustrating one of the liquid discharge heads 4Ka, 4Kb, 4Ya, 4Yb, 4Ma, 4Mb, 4Ca, and 4Cb (hereinbelow, sometimes referred to as a liquid discharge head 4 unless necessary), and FIG. 3 is a perspective view illustrating one of liquid discharge units 7 (hereinbelow, sometimes referred to as a liquid discharge unit 7 unless necessary). In the liquid discharge head 4 according to the present exemplary embodiment, a plurality of the liquid discharge units 7 each provided with an element substrate 10 including discharge ports 19 for discharging liquid is fixed onto a supporting member 40. In addition, the present disclosure can be suitably applied to a liquid discharge head having a configuration in which only one liquid discharge unit 7 is fixed onto one supporting member 40.

As illustrated in FIG. 2, the plurality of liquid discharge units 7 is arranged in a staggered manner on the liquid discharge head 4. Each of the liquid discharge units 7 is provided with about the 1,000 discharge ports 19, and can perform printing at 1,200 dots per inch (dpi). Electrical wiring substrates 20 such as flexible wiring substrates are connected to the element substrate 10. The electrical wiring substrates 20 are configured to supply energies and electrical signals for discharging liquid to the discharge ports 19.

<Flow Path Configuration of Element Substrate>

Figure 4:
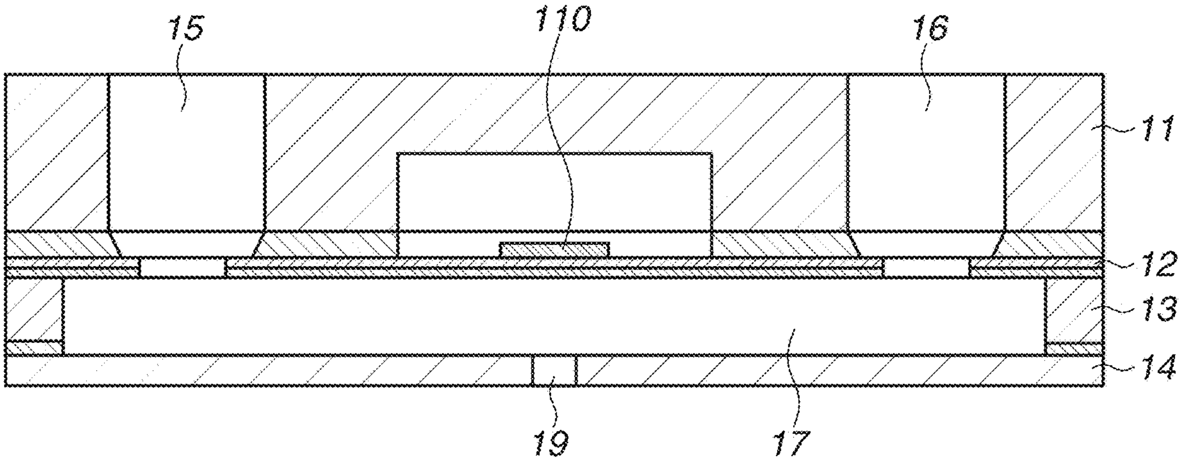
FIG. 4 is a cross-section diagram illustrating an example of an element substrate according to the present disclosure.

FIG. 4 is a cross-section diagram illustrating a flow path configuration of the element substrate 10 according to the present exemplary embodiment. The element substrate 10 includes a flow path substrate 11, an actuator substrate 12, a pressure chamber substrate 13, and a discharge port substrate 14.

The flow path substrate 11 includes a supply port 15 for supplying liquid to be discharged from the discharge port 19 to a pressure chamber 17, and an outlet port 16 for flowing out liquid from the pressure chamber 17. In this way, the element substrate 10 is configured so as to be able to circulate liquid between the inside and the outside of the pressure chamber 17. In addition, the piezoelectric actuator according to the present disclosure can be suitably applied even to a liquid discharge head having no circulation flow path configuration with no outlet port 16 in the flow path substrate 11. Further, the liquid discharge head 4 may be configured so as to supply liquid from both the supply port 15 and the outlet port 16 in FIG. 4 to the pressure chamber 17. The flow path substrate 11 according to the present exemplary embodiment is formed by etching a silicon substrate as an example, but any material and any production method may be used.

The actuator substrate 12 is joined to the flow path substrate 11. The actuator substrate 12 includes a substrate (substrate 100, see FIG. 6) and a piezoelectric element 110. Detailed configuration of the actuator substrate 12 will be described below, but in FIG. 4, the configurations of the actuator substrate 12 and the piezoelectric actuator described below are simply illustrated.

The pressure chamber substrate 13 is joined to a surface of the actuator substrate 12 opposite to the surface to which the flow path substrate 11 is joined. The pressure chamber 17 is provided in the pressure chamber substrate 13 so as to correspond to the piezoelectric element 110. Similar to the flow path substrate 11, any material and any production method may be used to form the pressure chamber substrate 13 according to the present exemplary embodiment by, for example, etching the silicon substrate.

The discharge port substrate 14 is joined to a surface of the pressure chamber substrate 13 opposite to the actuator substrate 12. The discharge port 19 is provided in the discharge port substrate 14. In the liquid discharge unit 7, liquid is supplied from the supply port 15 to the pressure chamber 17, and discharged from the discharge port 19 by driving of the piezoelectric element 110 to deform the actuator substrate 12.

In addition, a protection layer may be provided so as to cover an inner wall of a liquid flow path communicating from the supply port 15 to the pressure chamber 17, the discharge ports 19, and the outlet port 16. An effect of improving a long-term reliability of the liquid discharge unit 7 can be obtained by forming, on the inner wall of the liquid flow path, the protection layer using a material having a resistance to the discharging liquid higher than the silicon configuring the flow path substrate 11, the pressure chamber substrate 13, and the like.

In a case where the flow path substrate 11 and the pressure chamber substrate 13 are configured of silicon substrates, for example, silicon dioxide ($SiO_2$), silicon carbide (SiC), aluminum oxide ($Al_2O_3$), hafnium oxide ($HfO_2$), tantalum oxide (TaO), and diamond-like carbon (DLC) can be used for the protection layer.

<Configuration of Piezoelectric Actuator>

Next, the actuator substrate 12 serving as the piezoelectric actuator will be described in detail. Note that components described in the following exemplary embodiments are merely examples, and the components are not intended to limit the range of the present disclosure only thereto.

Figure 5:
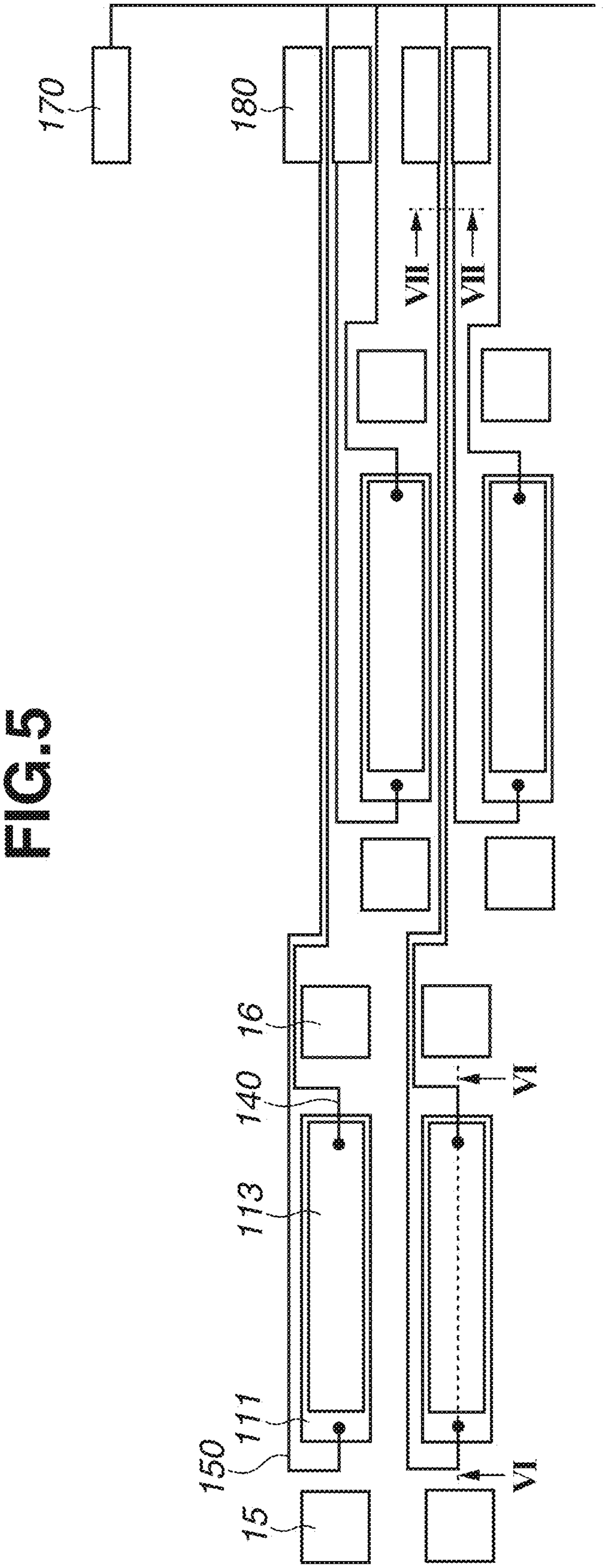
FIG. 5 is a plan view illustrating an example of a piezoelectric actuator according to the present disclosure.

In the liquid discharge head 4, in many cases, a configuration in which a plurality of the piezoelectric elements 110 is arranged is employed. Further, to achieve a high-resolution printing, the piezoelectric elements 110 are arranged on a substrate at high density. FIG. 5 is a partial plan view illustrating the actuator substrate 12 according to the present exemplary embodiment, viewed from a side of a surface joined with the flow path substrate 11, and two element arrays each including the piezoelectric elements 110 are arranged. In addition, in FIG. 5, insulation layers and protection layers described below are omitted to allow the arrangement of the piezoelectric elements 110 and wiring lines to be recognizable clearly.

An upper wiring line (second wiring line) 140 and a lower wiring line (first wiring line) 150 are connected to each of the piezoelectric elements 110, and a pad 170 and a pad 180 for applying a voltage to each of the piezoelectric elements 110 are connected thereto. In addition, the pads 170 and 180 in the present disclosure are electrically connected to the respective wiring lines (upper wiring line 140 and lower wiring line 150), are areas with their surfaces not covered by a passivation film described below, and are portions to be connected with an electric wiring substrate such as a flexible printed circuit (FPC) substrate outside the piezoelectric actuator, with wiring lines or the like.

Figure 6:
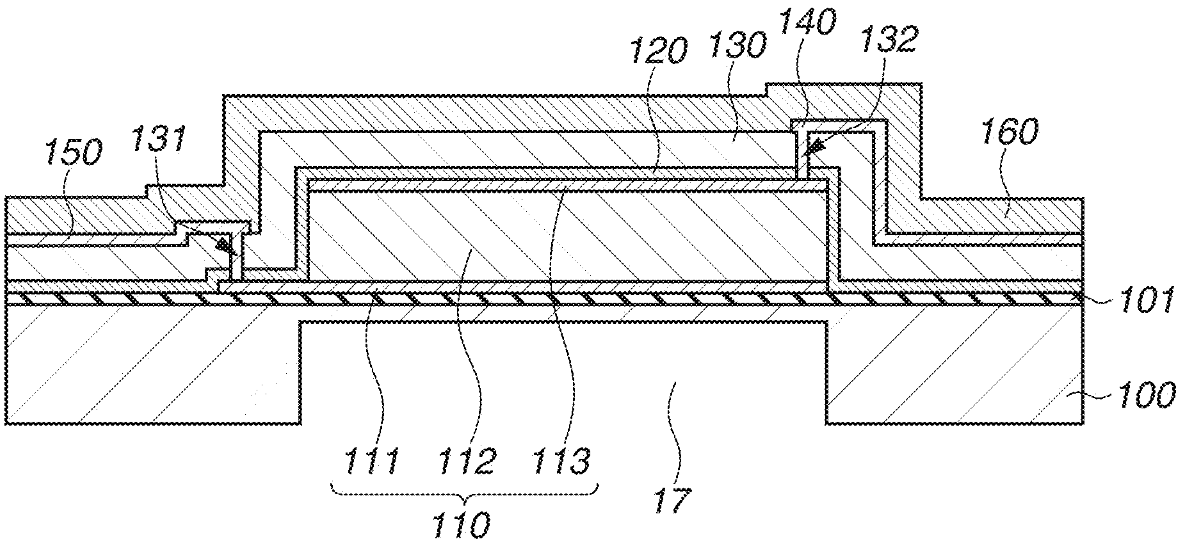
FIG. 6 is a cross-section diagram illustrating an example of the piezoelectric actuator according to the present disclosure.

FIG. 6 is a cross-section diagram illustrating the actuator substrate 12 taken along a VI-VI line in FIG. 5. As illustrated in FIG. 6, in the present exemplary embodiment, the actuator substrate 12 includes the piezoelectric element 110 in which a lower electrode (first electrode) 111, a piezoelectric layer 112, and an upper electrode (second electrode) 113 are formed on the substrate 100 in this order. The piezoelectric element 110 according to the present exemplary embodiment includes a first protection layer 120 formed so as to cover the lower electrode 111, the piezoelectric layer 112, and the upper electrode 113, a second protection layer (hereinbelow, also referred to as an insulation layer) 130 formed thereon so as to cover the first protection layer 120 at a position overlapping at least the lower wiring line 150 or the upper wiring line 140, and an insulation layer 160 serving as a third protection layer formed further thereon so as to cover at least the upper wiring line 140 and the lower wiring line 150.

The liquid discharge head 4 includes the pressure chamber 17 (see FIG. 4) on a surface of the substrate 100 opposite to the surface on which the piezoelectric element 110 is arranged, and the piezoelectric layer 112 is arranged so as to overlap the pressure chamber 17 in a direction perpendicular to the surface of the substrate 100.

The substrate 100 desirably has a flat surface, and its material can be appropriately selected. For example, materials such as silicon, silicon carbide, quartz, gallium nitride, gallium arsenide, indium phosphide, and sapphire can be suitably used. To easily form the pressure chamber 17, a Silicon On Insulator (SOI) substrate can be used as a substrate serving as both the substrate 100 and the pressure chamber substrate 13. In general, the SOI substrate has a layered structure in which a silicon oxide layer (BOX layer) is formed on a silicon substrate and a silicon layer is further formed thereon. For example, in the SOI substrate, a thicker silicon substrate can be used as the pressure chamber substrate 13, and a thinner silicon substrate and the BOX layer can be used as the substrate 100. The BOX layer can be formed to have a thickness between several tens of nanometers and several hundreds of micrometers, and the film thickness of the silicon layer on the BOX layer can be selected relatively arbitrarily. Only silicon can be removed by combining these film thicknesses appropriately, and performing selective etching using the BOX layer as an etching stop layer. In the case where the pressure chamber 17 is formed using such etching, since the bottom portion of the pressure chamber 17 is a surface of the BOX layer, an extremely flat bottom portion can be obtained.

In a case where the substrate 100 is formed with a silicon substrate or the like and electrically conductive, it is desirable to provide an insulation layer 101 between the lower electrode 111 and the substrate 100. For example, commonly used insulator materials, such as a silicon oxide film, a silicon nitride film, a silicon acid nitride film, and an aluminum oxide film, can be used for the insulation layer 101.

Since there may be a case where the lower electrode 111 is exposed to high temperatures of several hundred degrees Celsius in a firing process of the piezoelectric layer 112 thereafter, the lower electrode 111 is desirably formed of a material with a high melting temperature. Examples of the material include copper, platinum, gold, chrome, cobalt, titanium, and their alloys. Further, in a case where the piezoelectric layer 112 is formed so as to contact the surface of the lower electrode 111, the lower electrode 111 may also serve as a film for controlling the crystal orientation of the piezoelectric layer 112. In this case, a material having an appropriate crystal structure may be selected for the lower electrode 111. For example, in a case where lead zirconate titanate (PZT) is used for the piezoelectric layer 112, platinum can be used for the lower electrode 111 serving also as the crystal orientation control film. A generally used film formation method such as magnetron sputtering can be used for the platinum film formation, and the film thickness is appropriately adjusted so as to be able to obtain a desired orientation. Further, to increase the adhesiveness between the lower electrode 111 and the insulation layer 101 serving as an underlaying film, a thin film such as a titanium film and a chrome film may be further included as an adhesion layer. In this case, it is desirable to appropriately select a material having an appropriate crystal structure for the adhesion layer so as to be able to obtain a desired crystal orientation of the piezoelectric layer 112.

Further, examples of the material for the piezoelectric layer 112 include an oxidized material containing lithium and niobium or lithium and tantalum as main materials (e.g., lithium niobate or lithium tantalate), an oxidized material containing lead and titanium as main materials (e.g., lead titanate), an oxidized material with zirconium further added thereto (e.g., lead zirconate titanate), an oxidized material containing lead and niobium as main materials, an oxidized material including barium and titanium as main materials (e.g., barium titanate), an inorganic material such as zinc oxide, quartz, and aluminum nitride, and an organic material such as polylactic acid and polyvinylidine fluoride. Among the above-described materials, the lead zirconate titanate (PZT), which is an oxidized material mainly containing lead, zirconium, and titanium as main materials that are high in displacement efficiency, can be suitably used. The thickness of the piezoelectric layer 112 is determined based on a applied voltage to obtain a desired displacement amount and a piezoelectric characteristic, and in general, it is about 1 to 2 micrometers (μm).

The upper electrode 113 is formed on the piezoelectric layer 112, and for example, platinum, titanium, tungsten, and their alloys can be used for the upper electrode 113. Similar to the lower electrode 111, to increase the adhesiveness between the upper electrode 113 and the piezoelectric layer 112, a thin film made of titanium or chrome may be provided between the upper electrode 113 and the piezoelectric layer 112 as an adhesion layer.

In order to apply a desired voltage between the lower electrode 111 and the upper electrode 113 to displace the piezoelectric layer 112, the lower wiring line 150 is electrically connected to the lower electrode 111, and the upper wiring line 140 is electrically connected to the upper electrode 113. In this way, a potential difference based on an electrical signal transmitted from the outside can be applied to the piezoelectric layer 112. The materials forming the upper wiring line 140 and the lower wiring line 150 may be the same, or different. The materials used for the upper wiring line 140 and the lower wiring line 150 only need to be conductive members, but it is desirable to use a material having a low electric resistance to reduce the occurrence possibility of wire breakage caused by the electromigration. Examples of the material include aluminum, copper, and gold. Further, an alloy consisting of two or more materials from these materials may be used. Further, to increase the adhesiveness of the wiring lines, titanium or chrome films may be provided between the lower wiring line 150 and a film contacting the lower wiring line 150, and between the upper wiring line 140 and a film contacting the upper wiring line 140.

In the present exemplary embodiment, a silicon oxide film serving as the insulation layer (second protection layer) 130 is formed between the lower wiring line 150 and the lower electrode 111, between the upper wiring line 140 and the lower electrode 111, and between the upper wiring line 140 and the piezoelectric layer 112. In addition, the silicon oxide film is merely an example, and similar to the insulation layer 101, the material of the insulation layer 130 can be appropriately selected from commonly used insulation materials such as silicon nitride, silicon oxynitride, and aluminum oxide. The insulation layer 130 may be a layered film with two or more kinds of different films layered. To form the insulation layer 130, for example, a commonly used film formation method, such as a chemical vapor deposition (CVD) method or a sputtering method, can be used. In the present exemplary embodiment, the silicon oxide film was formed as the insulation layer 130 using the CVD method because the CVD method is excellent in production rate.

In the piezoelectric element 110 used for the liquid discharge head 4, a relatively large potential difference for a semiconductor device is applied between the upper electrode 113 (upper wiring line 140) and the lower electrode 111 (lower wiring line 150), to sufficiently displace the piezoelectric layer 112. To obtain a sufficient displacement amount, a potential difference of about 30 V or more is applied to the piezoelectric layer 112 in the film thickness direction. In a case where the insulation layer 130 is a silicon oxide film produced using the CVD method, the dielectric breakdown strength is about 7 megavolts per centimeter (MV/cm). Accordingly, for example, to achieve the dielectric strength of 50 V, a failure probability can be reduced by setting the film thickness of the insulation layer 130 to 72 nanometers (nm) or more. Further, the insulation layer 130 plays a role of a moisture prevention film for the lower layer thereof (first protection layer 120 described in detail below). To secure the moisture resistance for the underlaying film of the silicon oxide film, the film thickness is desirably 200 nm or more. On the other hand, if the film is too thick, since the displacement characteristic of the piezoelectric element deteriorates, the film thickness of the insulation layer 130 is desirably 1.5 μm or less. Accordingly, the film thickness of the insulation layer 130 is desirably 200 nm or more and 1.5 μm or less.

Further, to increase the adhesiveness of the insulation layer 130, a titanium or chrome thin film (not illustrated) may be provided between the insulation layer 130 and the upper wiring line 140, and between the insulation layer 130 and the lower wiring line 150.

When the silicon oxide film serving as the insulation layer 130 is formed, there is a possibility that the piezoelectric layer 112 is damaged to deteriorate the piezoelectric characteristic. In response, in the present exemplary embodiment, an aluminum oxide film serving as the first protection layer 120 is formed on the surface of the piezoelectric layer 112, as a protection layer to prevent the damage to the piezoelectric layer 112. On the other hand, the surface of the aluminum oxide film deteriorates when exposed to moisture at high temperature. In a case where a formation process of a contact hole (hereinbelow, also referred to as a lower through-hole) 131 and a contact hole (hereinbelow, also referred to as an upper through-hole) 132 (described below) or a formation process of the upper wiring line 140 and the lower wiring line 150 is performed in a state where the aluminum oxide film is exposed on the outermost surface in the middle of a production process, there may be a case where the surface of the aluminum oxide film is exposed to moisture at a time of cleaning after patterning. There is a case where the surface of the aluminum oxide film deteriorates when the moisture remaining on the surface of the aluminum oxide film becomes high in temperature at a time of etching or ashing. There may be a case where if the deteriorated aluminum oxide film is present on the piezoelectric layer 112, the insulation resistance property may deteriorate, which may cause a failure. For this reason, the silicon oxide film serving as the insulation layer 130 is desirably formed so as to contact and cover the aluminum oxide film serving as the first protection layer 120.

The first protection layer 120 desirably has a bare minimum thickness, from a viewpoint of reducing the influence on the displacement characteristic of the piezoelectric element and the formation of the contact holes 131 and 132. More specifically, the thickness of the first protection layer 120 is desirably 50 nm or less, and more desirably 25 nm or less. Further, for example, to achieve the dielectric strength of 50 V or more, the thickness of the aluminum oxide film serving as the first protection layer 120 is desirably 5 nm or more, in consideration of the step coverage property for the piezoelectric layer 112 having a micrometer order thickness. More specifically, the film thickness of the first protection layer 120 is desirably 5 nm or more and 50 nm or less, and more desirably 5 nm or more and 25 nm or less. Similarly, in a case where an aluminum oxide film is used for the first protection layer 120, an atomic layer deposition (ALD) method is desirably used, from a viewpoint of the step coverage property to the piezoelectric layer 112, e.g., introducing a precursor molecule to the substrate surface, purging an excess precursor, introducing a reactant molecule that reacts with the adsorbed precursor, purging the reaction byproducts, repeating this cycle to build up a layer-by-layer film with precise thickness control, each cycle resulting in the deposition of a single atomic layer.

Further, in the present exemplary embodiment illustrated in FIG. 6, the first protection layer 120 and the insulation layer 130 have the contact hole 131 for connecting the lower electrode 111 and the lower wiring line 150, and the contact hole 132 for connecting the upper electrode 113 and the upper wiring line 140.

As described above, a relatively high voltage is applied to the piezoelectric actuator used for the liquid discharge head 4 to obtain a sufficient displacement amount to discharge liquid, and in a case where the discharge ports 19 are arranged at high density, the area density of the piezoelectric elements 110 on the element substrate 100 is high. Under these conditions, and in an environment with high humidity caused by the piezoelectric actuator discharging ink, current may flow on the surface of the piezoelectric actuator, which may cause a failure. In the piezoelectric actuator used for the liquid discharge head 4 for discharging liquid such as ink, in particular, the existence of the liquid largely affects the piezoelectric actuator. For this reason, the upper wiring line 140 and the lower wiring line 150 are covered by the insulation layer 160 serving as a passivation film high in moisture resistance and insulation property. A silicon oxide film, a silicon nitride film, a silicon acid nitride film, and the like can be used for the insulation layer 160. In particular, a passivation film containing a silicon nitride film in a part of the film is higher in moisture resistance than the silicon oxide film, and can achieve the sufficient moisture resistance and the insulation property even with a thinner film thickness than the film thickness in the case of forming the passivation film with the silicon oxide film, which gives less bad influence on the displacement characteristic of the piezoelectric actuator, and is desirable. In addition, the insulation layer 160 desirably has a higher moisture resistance than the second protection layer 130. The moisture resistances of the two layers may be compared using a commonly used moisture resistance evaluation method such as a moisture intrusion evaluation.

From a viewpoint of the insulation property, the insulation layer 160 is desirably arranged to cover at least the lower wiring line 150, the upper wiring line 140, and the peripheral edges of the piezoelectric layer 112, viewed from the direction perpendicular to the substrate 100. The insulation layer 160 desirably has a bare minimum thickness, from a viewpoint of reducing the influence on the displacement characteristic of the piezoelectric element 110 and the formation of the contact holes 131 and 132. On the other hand, in the piezoelectric actuator according to the present exemplary embodiment, it is impossible to refill the piezoelectric layer 112 with the insulation layer 160 or the like and flatten the upper and lower wiring lines 140 and 150 formed thereon using a chemical mechanical polishing (CMP) method or the like, to prevent the displacement characteristic from being damaged. Thus, since the shapes of the upper wiring line 140 and the lower wiring line 150 take over the step shapes caused by the piezoelectric element 110, the insulation layer 160 needs to have a film thickness determined in consideration of the step coverage property for the piezoelectric layer 112, and the upper and lower wiring lines 140 and 150. The desirable thickness of the second protection layer 130 excellent in wiring line coverage property will be described below. In addition, to achieve a sufficient insulation resistance property of the piezoelectric actuator to which a high voltage of several tens of volts is applied, the thickness of the insulation layer 160 is desirably 100 nm or more.

Figure 7:
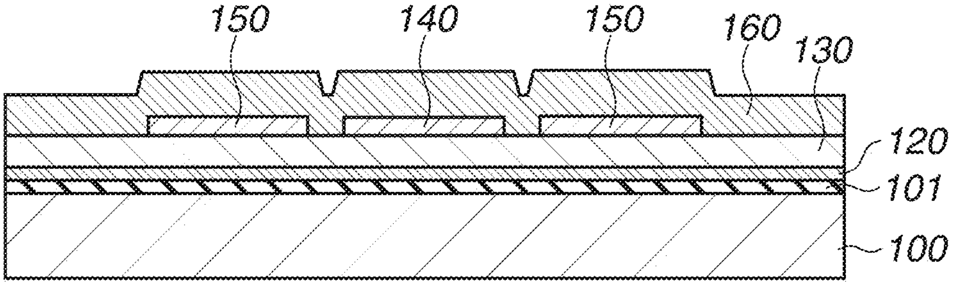
FIG. 7 is an expanded cross-section diagram illustrating an example of the piezoelectric actuator according to the present disclosure.

In the piezoelectric actuator for the liquid discharge head 4 according to the present exemplary embodiment, as illustrated in FIG. 5, the lower electrode 111, the lower wiring line 150, and the upper wiring line 140 are arranged at high density. More specifically, as an example, the piezoelectric actuator has eight element arrays each including the piezoelectric elements 110 linearly arranged at 150 dpi, i.e., at intervals of about 169 μm. FIG. 7 is a schematic diagram illustrating a cross section of the piezoelectric actuator taken along a VII-VII line in FIG. 5. As illustrated in FIGS. 5 and 7, the upper wiring line 140 and the lower wiring line 150 are alternately arranged at a narrow interval. Accordingly, when a high voltage of several tens of volts is applied to the piezoelectric actuator, if the coverage property of the insulation layer 160 covering the wiring lines (upper wiring line 140 and lower wiring line 150) and the piezoelectric element 110 is not sufficient or moisture exists on the surface of the piezoelectric actuator, there may be a case where a short circuit occurs between the upper and lower wiring lines 140 and 150 or between the upper and lower wiring lines 140 and 150 and lower electrode 111, or corrosion of the upper and lower wiring lines 140 and 150 occurs due to a creepage effect. Thus, as a means for sufficiently covering the upper and lower wiring lines 140 and 150 by the insulation layer 160, it may be conceivable that the film thickness of the insulation layer 160 is made thicker than the film thicknesses of the upper and lower wiring lines 140 and 150. However, in a case where the film thicknesses of the upper and lower wiring lines 140 and 150 (length in the direction perpendicular to the substrate 100) are thick, there may be a case where the formation of the insulation layer 160 thicker than the upper and lower wiring lines 140 and 150 becomes difficult. More specifically, the ALD method, which is a film formation method with a high coverage property, is slow in film formation speed, and may not be suitable to form the insulation layer 160 of several hundreds of nanometers to several micrometers. In addition, if the film thickness of the insulation layer 160 is too thick, the displacement characteristic of the piezoelectric element 110 may deteriorate. For this reason, the film thickness of the insulation layer 160 is desirably 500 nm or less, and further desirably 200 nm or less. Accordingly, to make the film thickness of the insulation layer 160 thicker than the film thickness of the upper and lower wiring lines 140 and 150 to sufficiently cover the upper and lower wiring lines 140 and 150 easily by the insulation layer 160, it is desirable to reduce the thicknesses of the upper and lower wiring lines 140 and 150, not to increase the thickness of the insulation layer 160.

In consideration of the above-described issue, the present disclosing party performed examinations to make the film thickness of the wiring line thin. First, when a voltage of an effective value 40 V and frequency 100 kilohertz (kHz) was applied to an element having an effective electrode area of about 0.05 $mm^2$, which was an area at which the upper electrode and the lower electrode overlap, viewed from the direction perpendicular to the substrate surface, the current flowing through the wiring line was less than 1 microamps (μA). Based on this value, as a result of producing wiring lines with several different cross-sectional areas and performing durability tests, it was found that the wiring line had an enough lifetime when the cross-sectional area of the wiring line had 165 $nm^2$ or more. Accordingly, the cross-sectional area at a position at which the cross-sectional area of the wiring line on a surface perpendicular to the substrate surface is smallest, which is normally a cross-sectional area in a width direction of the wiring line, was desirably 165 $nm^2$ or more. When the cross-sectional area of the wiring line was less than 165 $nm^2$, a wire breakage that may be due to an electromigration was found. Accordingly, it was found that even if the wiring lines (upper wiring line 140 and lower wiring line 150) were made thin to a film thickness that can maintain the film shape, i.e., to a degree not to become an island-like shape, the piezoelectric actuator was usable as a piezoelectric actuator.

Since the film thickness of the wiring line not to become the island-like shape depends on the material of the film in contact with the wiring line from a bottom side, and the film formation method, in a case where the film thickness of the wiring line is desired to be thin as much as possible, it is desirable to check the thickness of the wiring line after the process is completed.

Further, as for the upper limit of the film thickness of the wiring line, the thickness of the wiring line was made thinner than that of the insulation layer 160, and it was found that the wiring line was able to be easily and sufficiently covered by the insulation layer 160, in particular by making the thickness of the wiring line 200 nm or less, more desirably 100 nm.

Based on the above-described results, the piezoelectric actuator according to the present exemplary embodiment has a silicon nitride film with a thickness of 200 nm as the insulation layer 160 so as to be able to sufficiently cover the piezoelectric layer 112 with a thickness of 2 μm, and the lower wiring line 150 and the upper wiring line 140 with a thickness of 100 nm, as an example.

Figure 8:
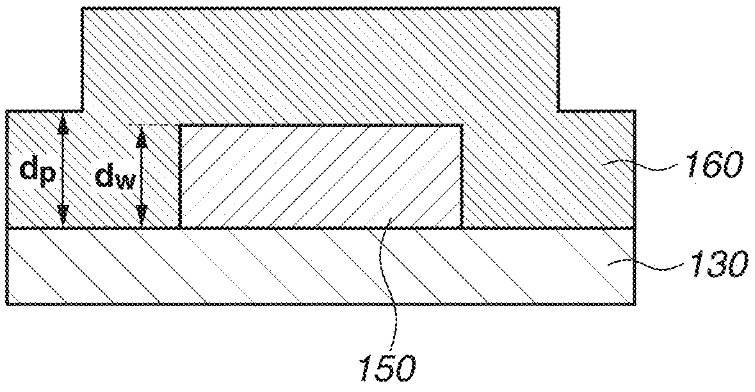
FIG. 8 is an expanded cross-section diagram illustrating an example of the piezoelectric actuator according to the present disclosure.

The film thicknesses of the wiring lines (upper wiring line 140 and lower wiring line 150) and the insulation layer 160 are approximately the same in an area formed on a uniformly flat plane surface. FIG. 8 is an expanded cross-section diagram in a shorter side direction of the wiring line (lower wiring line 150). In addition, FIG. 8 illustrates the lower wiring line 150, but the upper wiring line 140 is similar thereto. In the present disclosure, the film thickness of the insulation layer 160 is a thickness indicated by $d_p$ in FIG. 8, and is a film thickness in an area layered on the flat insulation layer 130. In an area in which the lower wiring line 150 has enough width and length, the film thickness of the insulation layer 160 formed on the upper surface of the lower wiring line 150 is almost $d_p$ near the center of the wiring line width. Further, in the present disclosure, the film thickness of the lower wiring line 150 is a thickness indicated by $d_w$ in FIG. 8. In a case where the insulation layer 130 is flat, the film thickness of the lower wiring line 150 is approximately $d_w$ to the edges of the lower wiring line 150, but in a case where the film thickness of the lower wiring line 150 is not uniform, a distance between the upper surface and the lower surface at the edges of the lower wiring line 150 in the shorter side direction is determined to be the thickness $d_w$ in the present disclosure. Further, at connection portions of the wiring lines and electrodes (connection portion of the upper wiring line 140 and the upper electrode 113, and connection portion of the lower wiring line 150 and the lower electrode 111), the wiring lines are formed via contact holes 131 and 132 arranged to penetrate through the insulation layer 130 and the first protection layer 120, but the film thickness of the lower wiring line 150 near the contact hole indicates the length from the upper surface of the insulation layer 130 to the upper surface of the lower wiring line 150 in the present disclosure.

Further, the film thickness of the wiring line (upper wiring line 140 or lower wiring line 150) is desirably thinner than that of the insulation layer 160 in the direction perpendicular to the substrate 100 at any position in the piezoelectric actuator so that the insulation layer 160 has an enough coverage property even in a configuration in which the film thickness of the wiring line is not uniform depending on the position, such as a case where the wiring line is formed along an edge surface of the piezoelectric layer 112. In addition, in a case where the insulation layer 160 has a layered structure consisting of a plurality of layers, the total thickness of all the plurality of stacked layers may be regarded as the thickness of the insulation layer 160.

<Production Method of Piezoelectric Actuator>

Figure 9A:
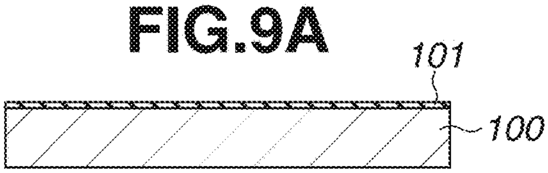
FIGS. 9A to 9I are diagrams illustrating a part of a production process of the piezoelectric actuator according to the present disclosure.

With reference to FIGS. 9A to 9I, a production method of the piezoelectric actuator having the configuration illustrated in FIG. 6 will be described. First, as illustrated in FIG. 9A, the substrate 100 made of silicon is prepared, and a silicon thermally-oxidized film with a film thickness of about 500 nm is formed as the insulation layer 101 by a wet oxidation method that uses oxygen and hydrogen gases.

Figure 9B:
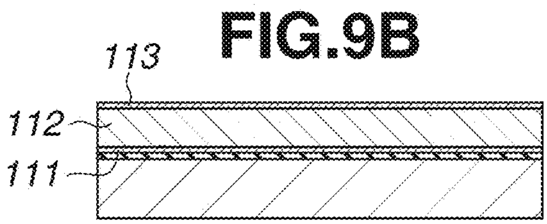

Subsequently, as illustrated in FIG. 9B, the lower electrode 111, the piezoelectric layer 112, and the upper electrode 113 are formed on the insulation layer 101 in this order.

The lower electrode 111 can be formed using, for example, a sputtering method. In addition, in a case where the piezoelectric layer 112 is made of lead zirconate titanate (PZT), platinum is desirably used for the lower electrode 111 serving also as a crystal orientation control film. In the present exemplary embodiment, a platinum film with a film thickness of about 100 nm is formed, as an example. A titanium or chrome thin film may be formed as an adhesion layer to increase an adhesive force between the lower electrode 111 and the insulation layer 101.

The piezoelectric layer 112 is formed by applying a starting material such as sol-gel liquid on the lower electrode 111 and firing it to have a desired crystal orientation, using a sol-gel method. In the present exemplary embodiment, a PZT film with a film thickness of 2 μm is formed, as an example.

Subsequently, the upper electrode 113 is formed using a sputtering method or the like. In the present exemplary embodiment, for example, a titanium and tungsten alloy film with a film thickness of about 100 nm is formed.

Figure 9C:
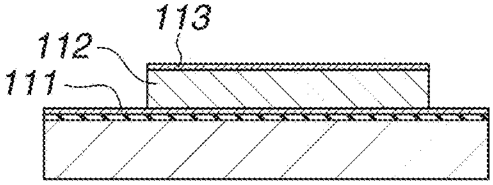

Subsequently, after forming a resist pattern (not illustrated) in such a manner that the upper electrode 113 and the piezoelectric layer 112 have a desired pattern by a photolithography method, the upper electrode 113 and the piezoelectric layer 112 are patterned as illustrated in FIG. 9C by etching.

Figure 9D:
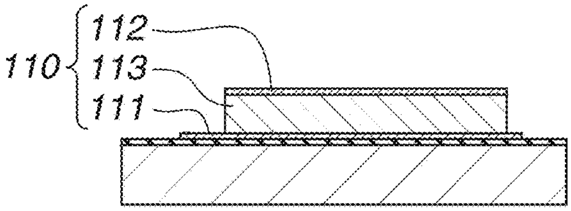

Subsequently, after forming a resist pattern (not illustrated) in such a manner that the lower electrode 111 has a desired pattern using a photolithography method, the lower electrode 111 is patterned as illustrated in FIG. 9D by etching. Through the above-described processes, the piezoelectric element 110 including the lower electrode 111, the piezoelectric layer 112, and the upper electrode 113 is formed.

Figure 9E:
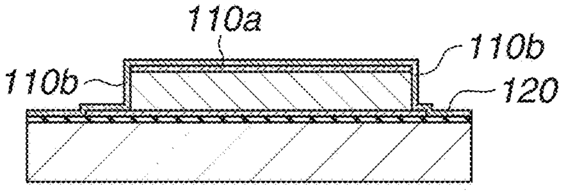

Subsequently, as illustrated in FIG. 9E, an aluminum oxide film serving as the first protection layer 120 is formed so as to cover at least an upper surface 110*a* and side surfaces 110*b* of the piezoelectric element 110, the lower electrode 111, and the upper electrode 113. In the present exemplary embodiment, an ALD method is used as the film formation method, and a film thickness is made 23 nm, as an example.

Figure 9F:
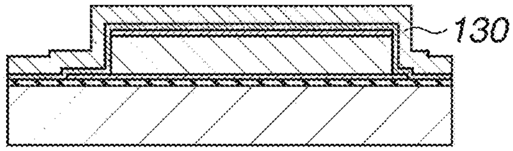

Subsequently, as illustrated in FIG. 9F, a silicon oxide film serving as the insulation layer 130 is formed to cover the first protection layer 120. In the present exemplary embodiment, the film thickness is 400 nm, as an example.

Figure 9G:
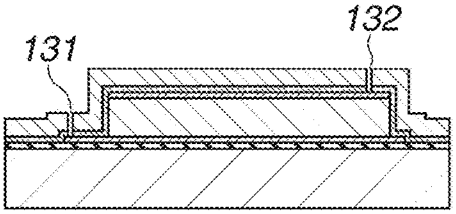

Next, as illustrated in FIG. 9G, the contact hole (upper through-hole) 132 and the contact hole (lower through-hole) 131 are formed using a photolithography method. After forming, on the insulation layer 130, a resist pattern (not illustrated) for forming the upper through-hole 132 and the lower through-hole 131 that are contact holes for the first protection layer 120 and the insulation layer 130, the upper through-hole 132 and the lower through-hole 131 are formed by etching.

Figure 9H:
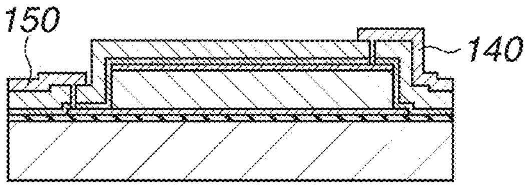

Subsequently, the upper and lower wiring lines 140 and 150 are formed using a commonly used semiconductor process. A wiring line layer to become the upper wiring line 140 and the lower wiring line 150 is formed on the insulation layer 130 using a sputtering method. In the present exemplary embodiment, a titanium film (not illustrated) serving as an adhesive layer is formed on the surface of the insulation layer 130 using sputtering or vapor-deposition, and an aluminum and copper alloy film serving as the wiring line layer is formed on the titanium film. Then, the titanium film and the wiring line layer are patterned by a photolithography method that uses a resist pattern, to form the upper wiring line 140 and the lower wiring line 150 as illustrated in FIG. 9H. Dry etching is preferably used for the etching of the wiring line layer, but wet etching may be used. In the present exemplary embodiment, as specific numeric values, the film thicknesses of the wiring lines (upper wiring line 140 and lower wiring line 150) are determined to be 30 nm, and the widths (lengths in the shorter side direction) thereof are determined to be 5 μm.

Figure 9I:
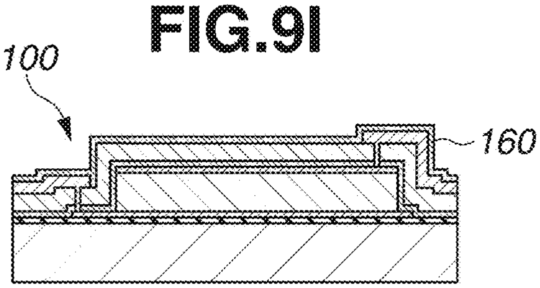

Subsequently, as illustrated in FIG. 9I, a silicon nitride film serving as the insulation layer 160 is formed so as to cover the upper wiring line 140 and the lower wiring line 150. The silicon nitride film is higher in moisture resistance than the silicon oxide film that forms the insulation layer 130, and is desirable as the insulation layer 160. In the present exemplary embodiment, the film thickness is 200 nm, as an example. As a formation method of the insulation layer 160, a method having a good coverage property on the wiring lines, and a fast film formation speed is desirable, and, for example, a CVD method is suitably usable. In a case where the film thicknesses of the wiring lines are thin, since the wiring lines are easily covered by the insulation layer 160 and the restriction on the coverage property is reduced, sputtering or vapor-deposition may be used. The actuator substrate 12 serving as the piezoelectric actuator is formed by etching the insulation layer 160 to become a desired pattern, by a photolithography method that uses a resist pattern.

Then, the pressure chamber substrate 13 and the discharge port substrate 14 respectively including the pressure chamber 17 and the discharge port 19, and the flow path substrate 11 including the flow path for supplying liquid to the pressure chamber 17 are prepared and joined with the actuator substrate 12 to form the liquid discharge head (see FIG. 4).

In the following exemplary embodiments, different points from the above-described first exemplary embodiment will be mainly described, and descriptions of configurations similar to those described above are omitted.

In a second exemplary embodiment, the thicknesses of the wiring lines are further thinner than those in the first exemplary embodiment. The thicknesses of the upper wiring line 140 and the lower wiring line 150 are determined to be 5 nm, and other configurations are determined to be the same as those of the first exemplary embodiment. By making the film thicknesses of the wiring lines extremely thin, the coverage property by the insulation layer 160 further increases. However, in a case where the film thickness of the piezoelectric layer 112 is thick, a part of the upper wiring line 140 formed along the edge surface of the piezoelectric layer 112 may be affected by the unevenness of the edge surface of the piezoelectric layer 112, to be broken.

In the present exemplary embodiment, an ALD method is used to form a wiring line film to be the upper and lower wiring lines 140 and 150, as a method to prevent the breakage of the thin upper wiring line 140. In this case, as a material of the wiring lines, any material is usable as long as the upper and lower wiring lines 140 and 150 can be formed using the ALD method. The upper wiring line 140 and the lower wiring line 150, which are a wiring line layer in the present exemplary embodiment, are made of copper with a film thickness of 5 nm, as an example. For the wiring line with an extremely thin film thickness, a layered film including a plurality of stacked layers may be usable. For example, using a layered film formed by continuously stacking a 3 nm titanium film and a 2 nm tungsten film as the upper wiring line 140 and the lower wiring line 150 may be conceivable.

The piezoelectric element 110 in the present disclosure has a piezoelectric layer 112 sandwiched by two electrodes (lower electrode 111 and upper electrode 113), but in this configuration, the lower and upper electrodes 111 and 113 and the piezoelectric layer 112 have a thin film form in many cases. In addition, the film thicknesses thereof are almost uniform, and the lower and upper electrodes 111 and 113 and the piezoelectric layer 112 are made to be desired sizes by an etching process or the like. Accordingly, the edge surfaces thereof each become an approximately perpendicular surface to the surface of the film. Further, in a case where the upper wiring line 140 and the lower wiring line 150 are located at a same position in the direction perpendicular to the substrate 100 as illustrated in FIG. 6, at least one of the upper and lower wiring lines 140 and 150 connected to the piezoelectric element 110 is formed along the edge surface of the piezoelectric layer 112, like the upper wiring line 140 in FIG. 6. In this case, in a case where the upper wiring line 140 is formed using a commonly used film formation method such as sputtering or vapor-deposition, the film thickness of the upper wiring line 140 may become thin to easily cause the breakage of the upper wiring line 140 near the edge surface of the piezoelectric layer 112. In particular, if the unevenness on the edge surface of the piezoelectric layer 112 is large, the breakage of the line easily occurs. There is a method of using the ALD method for the film formation of the wiring lines described in the second exemplary embodiment, as a method of preventing the breakage of the upper wiring line 140 at an edge surface 112*b* of the piezoelectric layer 112. As another method of preventing the breakage of the wiring line, in the present exemplary embodiment, the breakage of the wiring line is prevented, by not forming the wiring line along the edge surface 112*b* of the piezoelectric layer 112.

Figure 10:
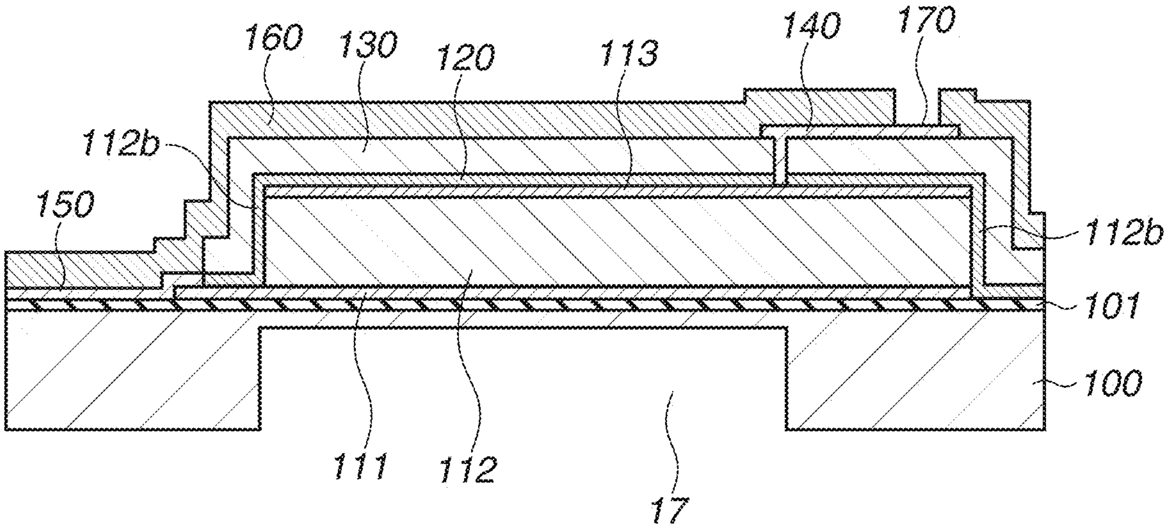
FIG. 10 is a cross-section diagram illustrating an example of a piezoelectric actuator according to the present disclosure.

FIG. 10 is a cross-section diagram illustrating a configuration of a piezoelectric actuator according to a third exemplary embodiment. The upper wiring line 140 and the lower wiring line 150 are located on different layers in the direction perpendicular to the substrate 100. Thus, the upper wiring line 140 is not formed along the edge surface 112*b* of the piezoelectric layer 112, and is formed vertically above the piezoelectric layer 112 in the direction perpendicular to the substrate 100.

Accordingly, the pad 170 connected to the upper wiring line 140 is formed vertically above the piezoelectric layer 112 in the direction perpendicular to the substrate 100. In addition, the pad 170 is desirably formed at a position at which the piezoelectric layer 112 is difficult to deform, i.e., at a position not overlapping the pressure chamber 17 in the direction perpendicular to the surface of the substrate 100. In addition, the pad 170 is desirably arranged not to intersect with the edge surface 112*b* of the piezoelectric layer 112 in the direction perpendicular to the surface of the substrate 100, and the shape of the piezoelectric layer 112 may be appropriately adjusted based on the shapes and arrangements of the upper wiring line 140 and the pad 170.

Further, in a case where a plurality of the piezoelectric elements 110 is arranged in a piezoelectric actuator, the piezoelectric layers 112 of two or more of the piezoelectric elements 110 may be connected in part. In other words, in the two or more of the piezoelectric elements 110, the piezoelectric layers 112 may be integrally formed, and the lower electrode 111 and the upper electrode 113 may be provided for each of the piezoelectric elements 110.

Figure 11:
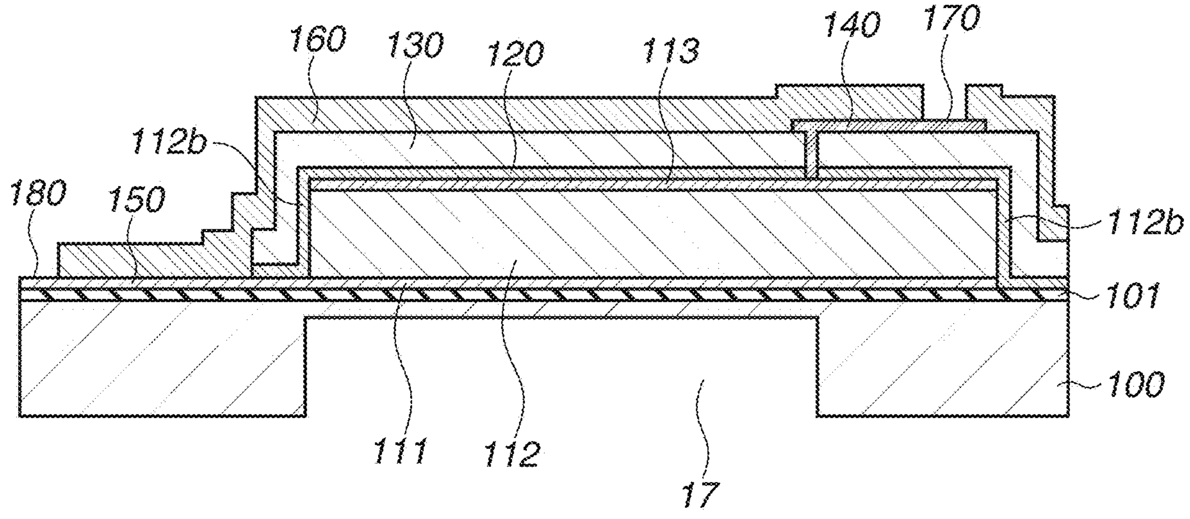
FIG. 11 is a cross-section diagram illustrating an example of a piezoelectric actuator according to the present disclosure.

In addition, since the lower wiring line 150 electrically connected to the lower electrode 111 is never formed along the edge surface 112*b* of the piezoelectric layer 112, and even if formed using a film formation method such as sputtering or vapor-deposition, the possibility that the film thickness thereof becomes extremely thin to cause the breakage of the line is not high. In FIG. 10, the lower wiring line 150 is formed on approximately the same level plane as the lower electrode 111. In this case, compared with the configuration illustrated in FIG. 6, an effect of eliminating a process of forming the contact hole 131 for connecting the lower electrode 111 and the lower wiring line 150 can be obtained. As a modification example of the present exemplary embodiment illustrated in FIG. 11, the lower electrode 111 may be formed to also serve as the lower wiring line 150, and in this case, an effect of being able to eliminate a process of forming the lower wiring line is obtained.

Figure 12A:
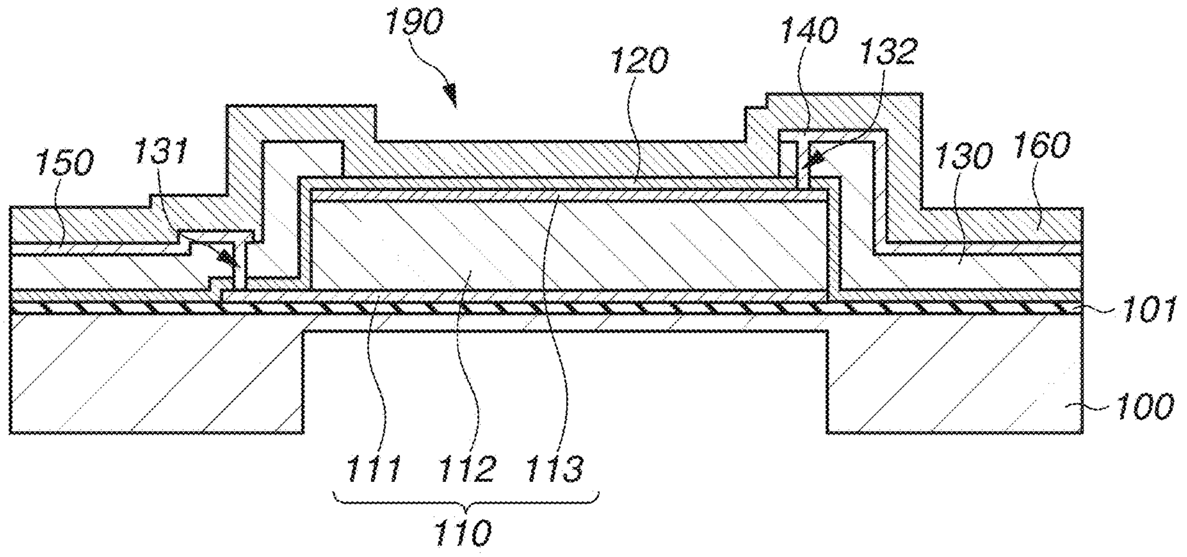
FIGS. 12A and 12B are cross-section diagrams illustrating an example of a piezoelectric actuator according to the present disclosure.
Figure 12B:
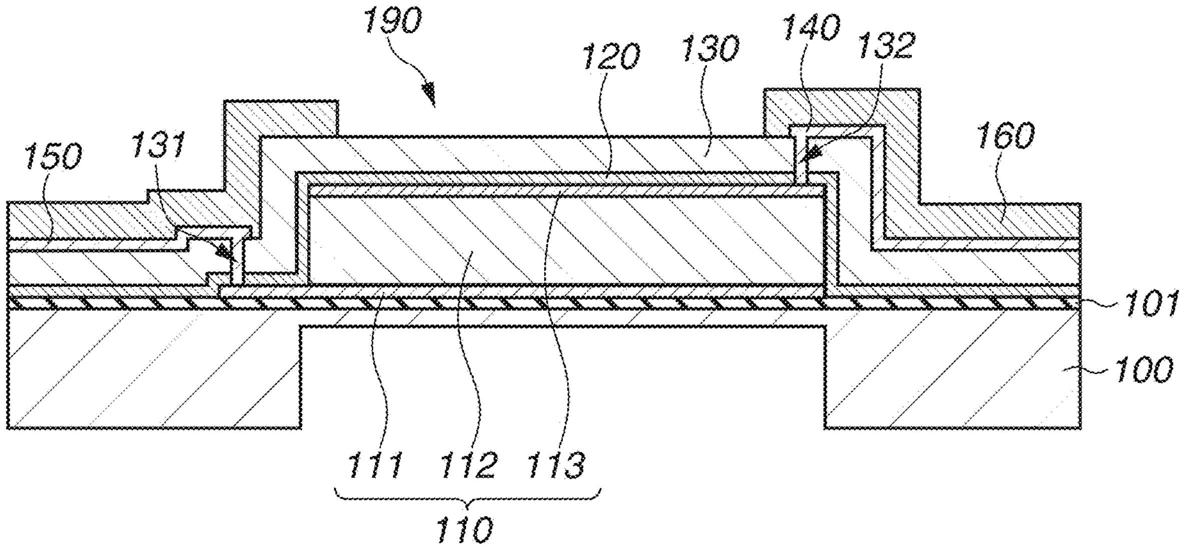

With reference to FIGS. 12A and 12B, a fourth exemplary embodiment of the present disclosure will be described. The present exemplary embodiment has a configuration in which a layer located on the upper surface 110*a* of the piezoelectric element 110 is removed in part, and the piezoelectric element 110 has a recessed portion 190. Since the recessed portion 190 is formed by removing a part of the layer located on the upper surface 110*a* of the piezoelectric element 110, the stiffness of the piezoelectric actuator can be reduced. With this configuration, the piezoelectric actuator can be driven by a voltage lower than the voltages in the other exemplary embodiments, and an effect of increasing the driving efficiency of the piezoelectric actuator can be obtained. FIG. 12A illustrates a configuration having the recessed portion 190 at which a silicon oxide film serving as the second protection layer 130 is discontinued. In other words, the second protection layer 130 has an opening in an area overlapping the piezoelectric layer 112 in a planar view. On the other hand, the second protection layer 130 is arranged at a position at which current leakage is easily occurs, i.e., between the lower electrode 111 and the lower wiring line 150, between the lower electrode 111 or the upper electrode 113 and the upper wiring line 140, and at a position overlapping a peripheral edge of the piezoelectric layer 112 in a planar view. Thus, even with the configuration according to the present exemplary embodiment, the deterioration of the characteristic of the piezoelectric layer 112 due to moisture, and the dielectric breakdown due to the increase of leak current are unlikely to occur. In addition, the recessed portion 190 may be formed by the second protection layer 130 not being open but recessed in the direction perpendicular to the substrate 100 in a planar view.

When the piezoelectric actuator according to the present exemplary embodiment is produced, in the process of forming the upper through-hole 132 and the lower through-hole 131 illustrated in FIG. 9G by etching, the recessed portion 190 can be formed by etching at the same time at least a part of the center portion of the second protection layer 130 on the upper surface 110*a* of the piezoelectric element 110. The recessed portion 190 may be formed after the formation process of the upper wiring line 140 and the lower wiring line 150 illustrated in FIG. 9H.

Further, as illustrated in FIG. 12B, the recessed portion 190 may be formed by making a recess or an opening in the insulation layer 160, not the second protection layer 130, in an area overlapping the piezoelectric layer 112 in a planar view. The recessed portion 190 may be formed by making openings in both the second protection layer 130 and the insulation layer 160. In the present disclosure, since the insulation layer 160 is not configured to be thick to cover the upper and lower wiring lines 140 and 150, it becomes easy to reduce a processing time and to control an etching depth when the insulation layer 160 is etched to form the recessed portion 190. In addition, from a view point of securing the moisture resistance for the piezoelectric layer 112, it is more desirable to reduce the stiffness of the piezoelectric actuator by removing the second protection layer 130 in part than removing the insulation layer 160 that is better in moisture resistance than the second protection layer 130.

Practical Example

The present disclosure will be described in more detail using a practical example and a comparison example, but the present disclosure is not limited by the following examples, within the gist of the present disclosure.

The piezoelectric actuator having the configuration illustrated in FIG. 6 according to the first exemplary embodiment was produced by the processes illustrated in FIGS. 9A to 9I. The film thickness or the like of each layer was determined as described in the first exemplary embodiment.

A silicon substrate was used for the substrate 100, a 500 nm thick silicon thermal oxide film was used for the insulation layer 101, a 100 nm thick platinum film was used for the lower electrode 111, a 2 μm thick PZT was used for the piezoelectric layer 112, and a 100 nm thick titanium and tungsten alloy was used for the upper electrode 113. An aluminum and copper alloy film was used for the upper wiring line 140 and the lower wiring line 150, and its thickness was 30 nm, its width (length in shorter side direction) was 5 μm, and its cross-sectional area in the shorter side direction was 150,000 $nm^2$. In addition, a titanium adhesion film was formed on a surface of the insulation layer 130 opposite to the substrate 100. A 200 nm thick silicon nitride film was used for the insulation layer 160.

As a result of observing the degree of corrosion by soaking the piezoelectric actuator produced as described above in the solution containing sodium hydroxide, the corrosion was not found on the upper wiring line 140 and the lower wiring line 150. Further, in high-temperature and high-humidity conditions, even after continuously applying a voltage of 40 V for 1,000 hours, the breakage of the wiring line was not found, and a result indicating a good actuation was obtained.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-189033, filed Nov. 6, 2023, which is hereby incorporated by reference herein in its entirety.

What is claimed is:

1. An actuator comprising:
- a piezoelectric element including a first electrode, a piezoelectric layer, and a second electrode on a substrate in this order;
- a wiring line electrically connected to at least one of the first electrode and the second electrode; and
- an insulation layer arranged to contact and cover the wiring line,
- wherein a thickness of the wiring line is less than a thickness of the insulation layer in a direction perpendicular to the substrate, and the thickness of the insulation layer is 500 nm (nanometers) or less.

2. The actuator according to claim 1, wherein a cross-sectional area of the wiring line is 165 $nm^2$ or more in the direction perpendicular to the substrate.

3. The actuator according to claim 2, wherein the thickness of the wiring line is 200 nm or less in the direction perpendicular to the substrate.

4. The actuator according to claim 2, wherein the thickness of the wiring line is 100 nm or less in the direction perpendicular to the substrate.

5. The actuator according to claim 1, wherein the insulation layer contains silicon nitride.

6. The actuator according to claim 1, wherein the thickness of the wiring line is 100 nm or more in the direction perpendicular to the substrate.

7. The actuator according to claim 1, wherein the insulation layer has a recessed portion recessed toward a side of the second electrode or an opening in an area overlapping the piezoelectric layer viewed from the direction perpendicular to the substrate.

8. The actuator according to claim 1, wherein the wiring line contains at least one element selected from aluminum, copper, and gold, as a main component.

9. The actuator according to claim 1, wherein the wiring line includes a first wiring line electrically connected to the first electrode and a second wiring line electrically connected to the second electrode.

10. The actuator according to claim 9, wherein the first wiring line and the second wiring line are located on a same layer in the direction perpendicular to the substrate.

11. The actuator according to claim 9, wherein the first wiring line and the second wiring line are arranged on respective different height layers in the direction perpendicular to the substrate.

12. The actuator according to claim 9, further comprising:
- a first protection layer covering the piezoelectric element; and
- a second protection layer arranged between the piezoelectric element and the first wiring line, and between the piezoelectric element and the second wiring line,
- wherein the first protection layer, the second protection layer, and the insulation layer are arranged in this order from the substrate.

13. The actuator according to claim 12, wherein the insulation layer is higher in moisture resistance than the second protection layer.

14. The actuator according to claim 12, wherein the second protection layer is arranged so as to cover the piezoelectric layer viewed from the direction perpendicular to the substrate.

15. The actuator according to claim 1, wherein the piezoelectric layer contains lead zirconate titanate.

16. A liquid discharge head configured to discharge liquid from a discharge port, comprising:
- an actuator having a piezoelectric element including a first electrode, a piezoelectric layer, and a second electrode on a substrate in this order, a wiring line electrically connected to at least one of the first electrode and the second electrode, and an insulation layer arranged to contact and cover the wiring line,
- wherein a thickness of the wiring line is less than a thickness of the insulation layer in a direction perpendicular to the substrate, and the thickness of the insulation layer is 500 nm (nanometers) or less.

17. The liquid discharge head according to claim 16, further comprising a pressure chamber for supplying liquid to the discharge port,
- wherein the substrate configures one of wall surfaces of the pressure chamber.

18. The liquid discharge head according to claim 16, wherein the liquid discharge head discharges ink as the liquid.

19. A production method of an actuator having a piezoelectric element including a first electrode, a piezoelectric layer, and a second electrode on a substrate in this order, a wiring line electrically connected to at least one of the first electrode and the second electrode, and an insulation layer arranged to contact and cover the wiring line, wherein a thickness of the wiring line is less than a thickness of the insulation layer in a direction perpendicular to the substrate, and the thickness of the insulation layer is 500 nm (nanometers) or less, the production method of the actuator comprising:
- forming the insulation layer using an atomic layer deposition (ALD) method.

20. A production method of an actuator according to claim 19, the method comprising the forming the insulation layer using the ALD method including introducing a precursor molecule to a substrate surface, purging an excess precursor, introducing a reactant molecule that reacts with an adsorbed precursor, and purging reaction byproducts.

* * * * *